(12) United States Patent
Van Cleave et al.

(10) Patent No.: US 6,755,067 B1
(45) Date of Patent: Jun. 29, 2004

(54) TRIM STOCK SCORING TOOL

(75) Inventors: Jeffrey Van Cleave, Troy, MI (US); Eugene G. Eichhorn, Pinckney, MI (US); Matthew S. Damron, Ypsilanti, MI (US); Joseph W. Pawlow, Redford, MI (US)

(73) Assignee: Van Mark Products Corporation, Farmington Hills, MT (US)

( * ) Notice: Subject to any disclaimer, the term of this patent is extended or adjusted under 35 U.S.C. 154(b) by 25 days.

(21) Appl. No.: 09/706,191

(22) Filed: Nov. 3, 2000

Related U.S. Application Data (60) Provisional application No. 60/163,604, filed on Nov. 4, 1999.

(51) Int. Cl.[7] .......................... B21D 43/28; B21D 5/04; B26D 1/04
(52) U.S. Cl. ............................. 72/294; 83/881; 83/614; 83/627
(58) Field of Search ......................... 83/614, 627, 881; 72/294

(56) References Cited

U.S. PATENT DOCUMENTS

| | | | |
|---|---|---|---|
| 1,265,608 A | | 5/1918 | Carpenter |
| 4,158,977 A | * | 6/1979 | Logan ....................... 83/614 X |
| 4,566,304 A | | 1/1986 | Van Cleave et al. |
| 4,646,439 A | * | 3/1987 | Squires ..................... 83/614 X |
| 4,660,399 A | | 4/1987 | Suter et al. |
| 4,672,874 A | * | 6/1987 | Gach .......................... 83/881 |
| 4,787,233 A | | 11/1988 | Beymer |
| 4,867,023 A | * | 9/1989 | Kozyrski et al. ......... 83/614 X |
| 4,989,429 A | | 2/1991 | Del Fabro et al. |
| 5,272,947 A | * | 12/1993 | Peters ....................... 83/614 X |
| 5,322,001 A | * | 6/1994 | Boda ........................ 83/614 X |
| 5,325,752 A | * | 7/1994 | Bory ........................ 83/614 X |
| 5,425,259 A | | 6/1995 | Coben et al. |
| 5,582,053 A | | 12/1996 | Chubb et al. |
| 5,632,174 A | | 5/1997 | Hunter |
| 5,706,693 A | | 1/1998 | Chubb et al. |
| 6,000,268 A | * | 12/1999 | Van Cleave et al. ...... 72/294 X |
| 6,315,474 B1 | * | 11/2001 | Giles et al. ............... 83/614 X |

OTHER PUBLICATIONS

Tapco Products Company Advertisement re: Pro Cut–Off, 1997.
Schechtl Advertisment re: Die Mobilen am Bau, May, 1996.
Knoll–Profilierkopf/Knoll–Schneidkopf Advertisement, 1993.
Peter Wukovich GesmbH "Wuko Handgerate" Advertisement, (No known publication date).
Fedor Ulisch GMBH Klempnerei–Maschinen Advertisement, Jan., 1991.
Fedor Ulisch GMBH Varia 1020/Varia 2050 Advertisement, Feb., 1993.
Van Mark Products Corporation Advertisement "The Short-Cut", Oct., 1997.
Jouanel Industrie "Table Coupe Zinc et Coupe Zinc" Advertisement (No known publication date).
Malvern Tools, Inc. "Brake Buddy" Advertisement (No known publication date).
Dimos "Coupe–Feuille Rotalame" Advertisement (Made of record in U.S. Pat. No. 5,582,053, issued Dec. 10, 1996).
Nesta Couverture "Outil de Coupe" Advertisement (Made of record in U.S. Pat. No. 5,582,053, issued Dec. 10, 1996).

* cited by examiner

Primary Examiner—Charles Goodman
(74) Attorney, Agent, or Firm—Brooks Kushman P.C.

(57) ABSTRACT

A scoring tool supported by a carriage that is moved along a track on a sheet stock bending brake. A knife blade is pressed into engagement with sheet stock as the carriage is moved on a track. The knife blade is pivotally retained in a retainer housing that is secured to the carriage. Force is applied to the knife either by adjustable screws or directly by a handle connected to the knife holder.

10 Claims, 8 Drawing Sheets

TRIM STOCK SCORING TOOL

CROSS-REFERENCE TO RELATED APPLICATIONS

This application claims the benefit of U.S. Provisional Application No. 60/163,604 filed Nov. 4, 1999, titled "Trim Stock Scoring Tool" the specification of which is expressly incorporated herein by reference in its entirety.

TECHNICAL FIELD

The present invention relates to a scoring tool for trimming sheet metal or vinyl sheet stock in a bending brake.

BACKGROUND ART

In construction and building trades, aluminum trim installation applications use aluminum sheet metal or vinyl for trimming out soffit, fascia, corners and edges of siding sections and window and door frames. Sheet metal or vinyl from coil stock is cut, shaped or bent by workmen on-site using sheet metal bending brakes, saw tables and coil slitters. The sheet metal or vinyl is held by the bending brake during forming operations. Common bends created include simple flanges, brick molding, and J channel shapes. The stock material is also held by the bending brake for cutting to size.

Roller cutters having opposed rollers have long been used in Europe and were recently introduced in the United States to cut material longitudinally along the length of the brake. A problem with the use of opposed rollers to cut thin sheet stock is that the roller cutters may leave a wavy edge that is referred to as "rippling." This is an inherent problem due to the need for roller cutters to cut different thicknesses of material. In particular, roller cutters are most effective when there is an overlap of the opposed rollers equal to approximately 7% of material thickness. If there is any variance from this optimum overlap, rippling will result.

Other problems with roller cutters can cause rippling. If the roller cutter knives separate laterally the knives will tend to tear the material rather than cut the material causing rippling. Also, if the tool becomes misaligned on the top clamping bar, this may be referred to as being "toed-in" or "toed-out," the tool may make irregular cuts causing rippling.

Sheet stock having a thickness of 0.019" to 0.040" is commonly cut with roller cutters and formed with portable sheet metal bending brakes. The rollers can be set to cut thicker sections of material with a 7% overlap, but when thinner sections of material are subsequently cut, they may ripple due to excessive overlap. If the rollers are set to provide a 7% overlap to cut thin material then cutting quality problems may arise when thicker stock is cut. Rippling and inaccurate cutting can also result if there is a slight variance in the tool geometry or location of the cutting rollers.

As a piece of material is cut off from a main section by a roller cutter, the piece cut-off is generally unsupported and drops to the ground. Since the tools are intended to be used at a job-site the material cut-off may be damaged when it falls to the ground.

Roller cutters also suffer from the disadvantage of being difficult to precisely align the location of a cut since there is no quick reference provided on the roller cutter or brake for the location of the cut made by the roller cutter. Once the tool is aligned, the roller cutter may tend to ride up and off the track formed on the top clamping bar.

Another approach used in the prior art is to score a section of sheet metal or vinyl with a utility knife that is guided "freehand" by following a lip of an upper clamping member of the sheet metal bending brake. The lip of the upper clamping member is generally located directly above a piano-type hinge that is used to connect a lower bending bar to clamping jaws of the sheet metal bending brake. Generally, a worker will score the coil stock by moving the utility knife along the lip of the upper clamp to score the material. A worker pulls up on the handle of the bending bar causing the bending anvil to work the material at the point where it has been scored by closing the score line. Generally this is insufficient to break the sheet metal which must then be bent up and down repeatedly until the metal breaks at the score line. This process may leave a rough edge on the material because the material is bent back and forth. This method also can result in the score line having curves or deviations especially if the worker is not experienced or careless in scoring the coil stock. Furthermore, the hinge and other parts of the brake can be nicked or scraped by a utility knife if the utility knife is pushed beyond the end of the sheet stock.

These and other problems and disadvantages associated with the prior art devices for trimming sheet metal are resolved by Applicant's invention as will be summarized below.

DISCLOSURE OF INVENTION

According to the present invention, a trim stock scoring tool is provided that includes a knife blade mounted on a carriage. Vinyl or aluminum sheet stock is held in a bending brake, slitter, saw table, or coil holder that is provided with a track on which the carriage is designed to be moved to score the sheet stock.

According to another aspect of the invention, the carriage holds the knife so that it contacts the section of coil stock to be trimmed immediately outboard of the bending bar of the bending brake so that the knife blade does not come in contact with the hinge or any other part of the brake if it is moved past the edge of the coil stock. The outboard location of the score line facilitates breaking off the piece of coil stock by bending the coil stock downwardly against the outboard edge of the bending bar, causing the score line to be expanded as the metal or vinyl is bent downwardly. If an appropriate depth of cut has been achieved, a single downward bend of the portion of the stock to be trimmed off should be sufficient to break the stock. In some instances, a single downward bend may cause the material to fracture and a single upward bend, back to level, will sever the material.

The carriage preferably is provided with concave rollers that follow a complimentary convex track that assures that the score line is formed in a straight line.

In practice, the invention may use common utility knife blades that are mounted on a knife retainer that is in turn pivotally supported in a knife retainer housing. The knife retainer is pivotally supported to allow adjustment of the height of the knife blade so that as it is pushed (or pulled) across the coil stock it causes the coil stock to be scored. The knife retainer preferably retracts into a knife retainer housing that shields the knife blade during storage.

The outer edge of the bending bar is preferably located approximately ¾" outboard of the upper clamp bending edge. This corresponds to the most common segment of length for hemming or for forming brick molding and J channel shapes. By locating the cut ¾" from where a bend will be formed, the brake may be clamped on a section of sheet stock, trimmed with the trim stock scoring tool and then the ¾" bend may be formed without having to reposition and reclamp the material.

Layout of cut locations is simplified using the trim stock scoring tool of the present invention since the cut is always formed at the outer edge of the bending bar. Workmen may simply visually line up marks located on the sheet stock for cut locations with the outer edge of the bending bar, thereby eliminating the need to make additional measurements that are required with roller cutters.

The knife retainer housing of an alternative embodiment of the invention may include an adjustable mounting mechanism for mounting the knife retainer within the knife retainer housing so that the knife blade is at the proper height for scoring. The adjustment mechanism may include a spring that exerts a biasing force downwardly on the knife retainer causing the knife blade to be resiliently secured within the knife retainer housing. This resiliency provides some degree of tolerance in adjusting the height of the knife so that adequate scoring is provided without overscoring that can lead to excessive knife wear. The force applied to the knife may be controlled by the strength of the spring used.

An alternative method of securing the knife retainer within the knife retainer housing is to provide an arcuate slot and screw lock connection between the knife holder and the retainer housing.

A preferred embodiment of the invention may include a handle for the knife retainer that is pressed by a worker's hand to apply the appropriate degree of force for scoring the sheet stock.

The knife retainer housing may be removed from the carriage to permit other tools such as a roll forming tool to be attached to the carriage.

These and other advantages of the invention will be better understood in view of the attached drawings and detailed description of the invention below.

BEST MODE FOR CARRYING OUT THE INVENTION

Figure 1:
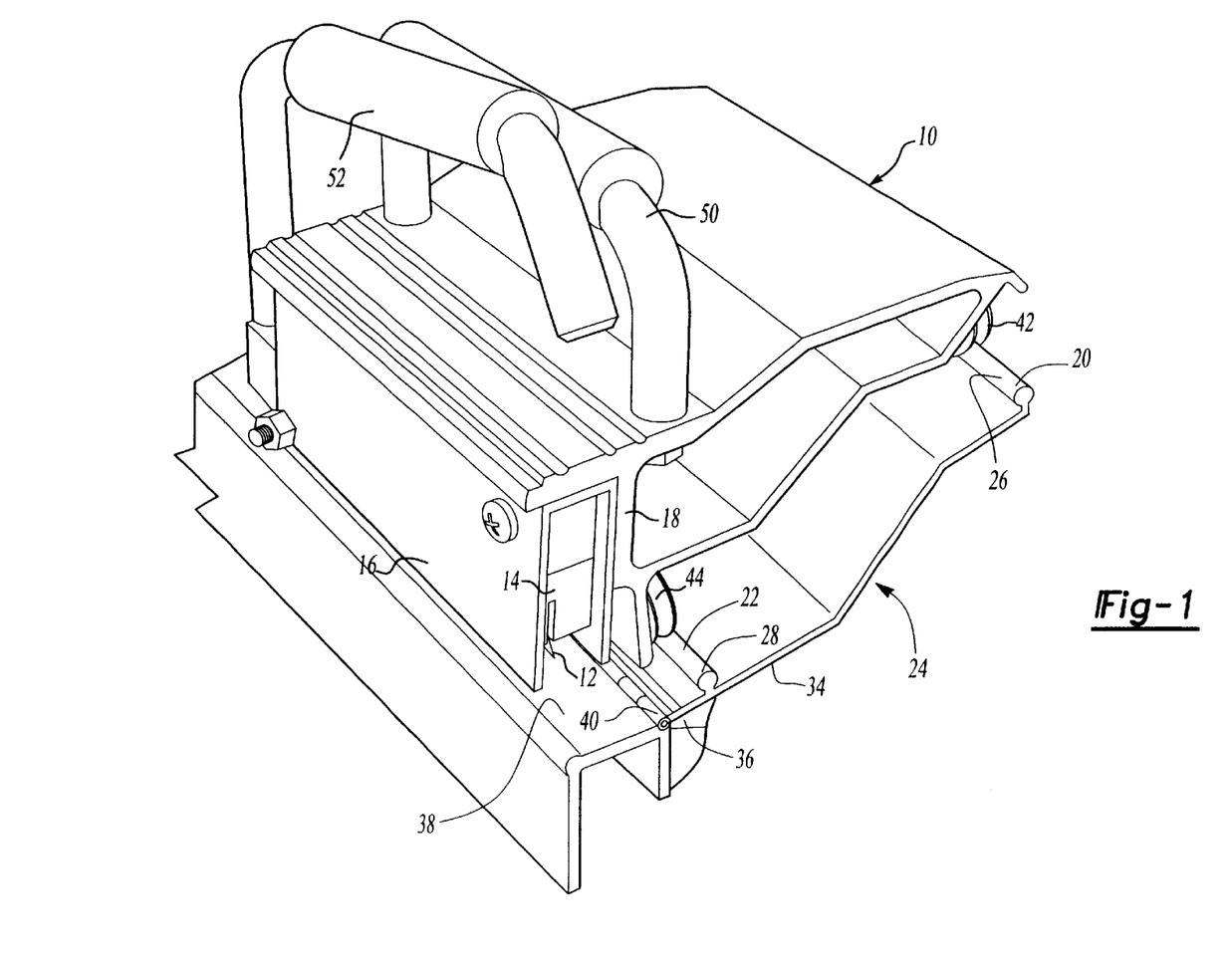
FIG. 1 is a perspective view of one embodiment of a trim stock scoring tool of the present invention shown on a bending brake.

Referring now to FIG. 1, one embodiment of a scoring tool 10 made in accordance with the present invention is illustrated. The scoring tool 10 includes a knife blade 12 that is retained in a holder 14. The holder 14 is secured within a retainer housing 16 which is, in turn, secured to a carriage 18. An upper track 20 and a lower track 22 are both provided on a bending brake 24. Upper and lower tracks 20,22 each have a convex edge 26,28, respectively.

With continued reference to FIG. 1, the bending brake 24 includes an upper clamp jaw 34 and a lower clamp jaw 36 are used to clamp a section of stock in the bending brake 24 for bending or cutting operations. A bending bar 38 is connected by a hinge 40 to lower clamp jaw 36. The knife blade 12 is held so that it contacts the section of coil stock to be trimmed immediately outboard of the hinge 40 of the bending brake 24 so that the knife blade 12 does not come in contact with the hinge 40 if it is moved past the edge of the coil stock.

The knife blade 12 and outer edge of the bending bar 38 are preferably located approximately ¾" outboard of the upper clamp jaw 34. This corresponds to the most common segment of length for forming brick molding and J channel shapes. By locating the cut ¾" from where a bend will be formed, the brake 24 may be clamped on a section of sheet stock, trimmed with the trim stock scoring tool 10 and then the ¾" bend may be formed without having to reposition and reclamp the material. Layout of cut locations is simplified using the trim stock scoring tool 10 since the cut is always formed at the outer edge of the bending bar 38. Workmen may simply visually line up marks located on the sheet stock for cut locations with the outer edge of the bending bar 38.

Upper and lower rollers 42,44 are provided on the carriage 18 for engaging the bending brake 24 as more specifically described below with reference to FIG. 3. Upper and lower rollers 42,44 may be concave to securely engage the convex edges 26, 28 of the upper and lower tracks 20,22.

The carriage 18 includes a carriage handle 50 that is fixedly secured to the carriage 18. In addition, knife control handle 52 is connected to the holder 14 and is used to apply force by hand to the holder and knife blade as the carriage 18 is moved along the bending brake 24. The retainer housing 16 may be removed from the carriage 18 to permit other tools such as a roll forming tool to be attached to the carriage 18.

Figure 2:
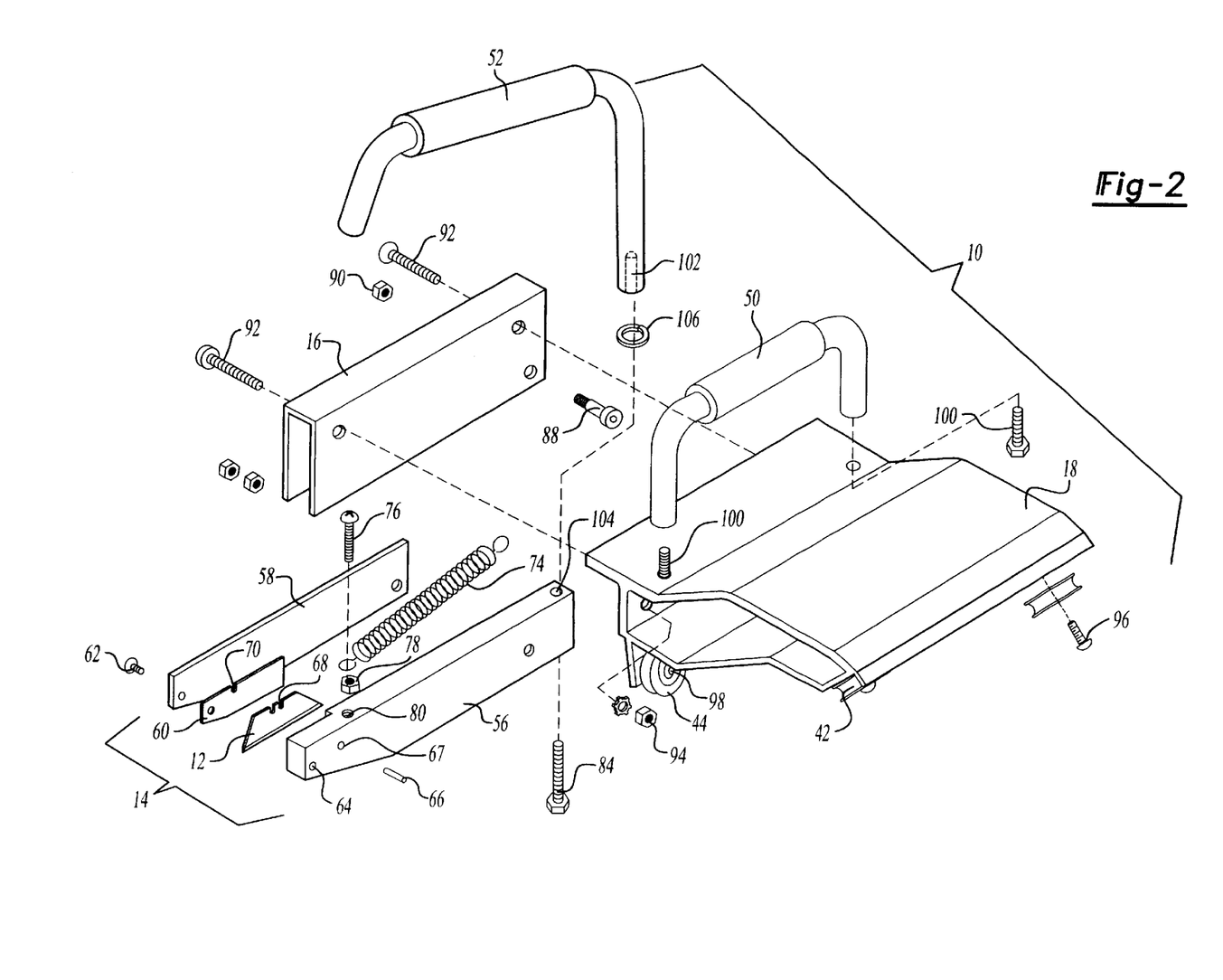
FIG. 2 is an exploded perspective view of the embodiment of the trim stock scoring tool of the present invention of FIG. 1.

Referring now to FIG. 2, the scoring tool 10 will be described in greater detail. The knife blade 12 is held in the holder 14. The structure of the holder 14 includes a holder body 56, a holder cover plate 58 and a blade spacer 60 that are held together by one or more blade screws 62. Each blade screw 62 extends through the holder cover plate 58 and blade spacer 60, and is received in a threaded hole 64 formed in the holder body 56. A blade pin 66 extends through a hole 67 in the holder body 56. The blade pin 66 engages a blade notch 68 in blade 12 and a spacer notch 70 in blade spacer 60 to hold the blade 12 in place within the holder 14.

A biasing spring 74 is secured to a spring retention bolt 76. The spring retention bolt 76 is received by a spring retention nut 78 and a spring retention hole 80 formed in the holder body 56. A retainer bolt 92 is received in the opposite end of the spring 74 from the spring retention bolt 76.

A pivot bolt 88 and pivot bolt nut 90 extend through the retainer housing 16 and the holder 14. The holder 14 is pivotally mounted on the pivot bolt 88 so that the knife blade 12 can be extended and retracted from one side of the retainer housing 16. Spring 74 pulls the knife blade 12 into a retracted position when not in use. Retainer bolts 92 and retainer nuts 94 secure the retainer housing 16 to the carriage 18.

Upper concave rollers 42 are secured to the carriage 18 by means of upper roller bolts 96. Lower roller bolts 98 secure the lower concave rollers 44 to the carriage 18. The carriage handle 50 is bolted to the carriage 18 by means of bolts 100.

Knife control handle 52 has a threaded hole 102 in one end of the handle that is adapted to receive scoring tool handle bolt 84. Bolt 84 extends through a hole 104 in the holder 14 through a lock washer 106 and is tightened into the threaded hole 102. Pressure applied to the knife control handle 52 determines the force applied to the blade 12 for scoring the sheet stock.

Figure 3:
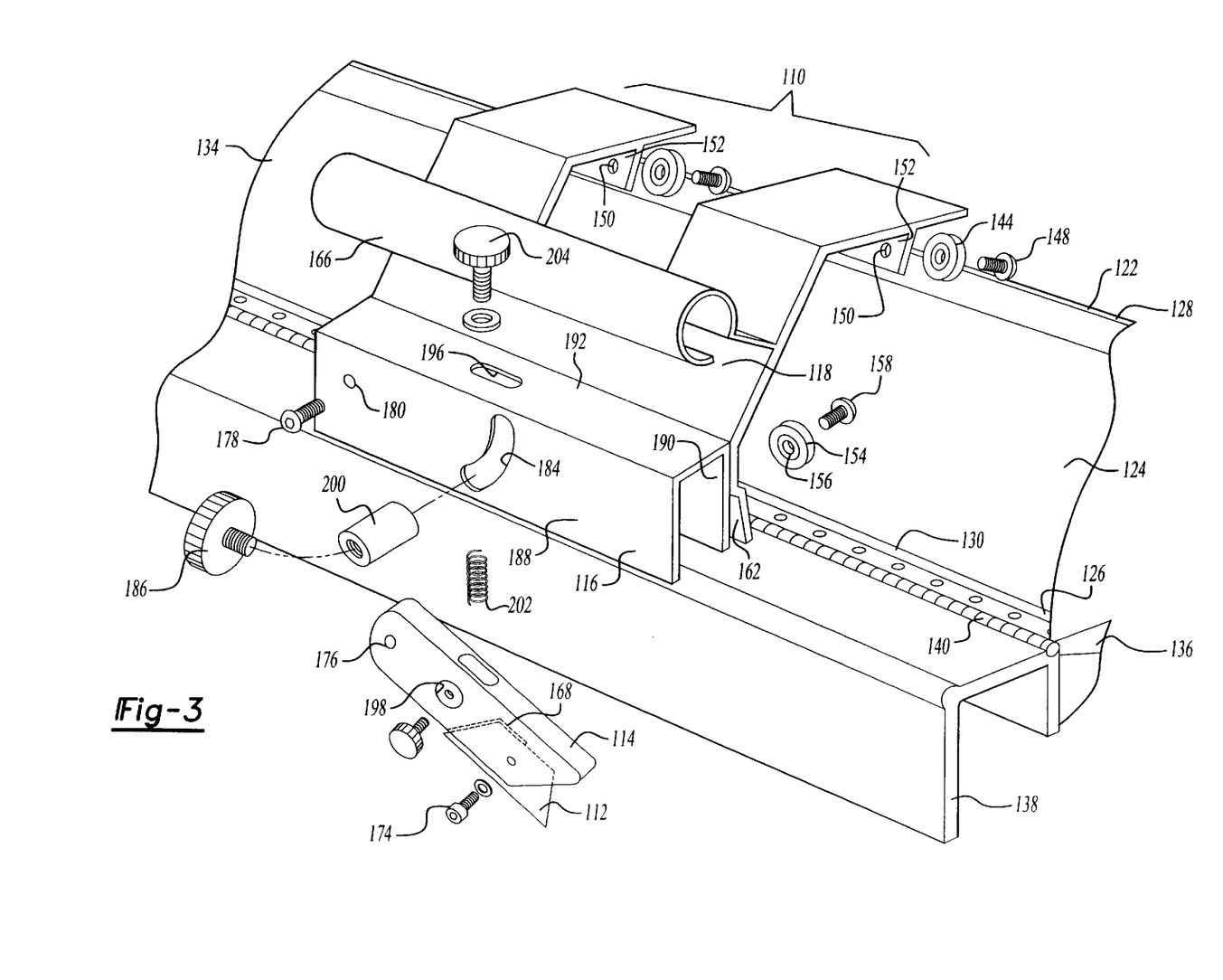
FIG. 3 is an exploded perspective view of another embodiment of the trim stock scoring tool of the present invention shown on a bending brake.

Referring now to FIG. 3, a second embodiment of a scoring tool 110 made according to the present invention is shown supported on a bending brake 124. The scoring tool 110 supports a knife blade 112 in a holder 114. The holder 114 is pivotally secured within a retainer housing 116. Retainer housing 116 is fastened to a carriage 118 that is adapted to be received on a track 122 formed or attached to a bending brake 124. A rail 126 is also provided on the bending brake 124. The track 122 preferably includes a convex upper edge 128 while the rail 126 has a convex surface 130 forming the top of the rail 126.

Bending brake 124 includes an upper clamp jaw 134 and a lower clamp jaw 136 that are used to clamp a section of coil stock for bending or cutting operations. A bending bar 138 is connected by hinge 140 to the lower clamp jaw 136. Bending bar 138 is used to bend a section of coil stock after it is clamped between the upper and lower clamp jaws 134 and 136.

Figure 4:
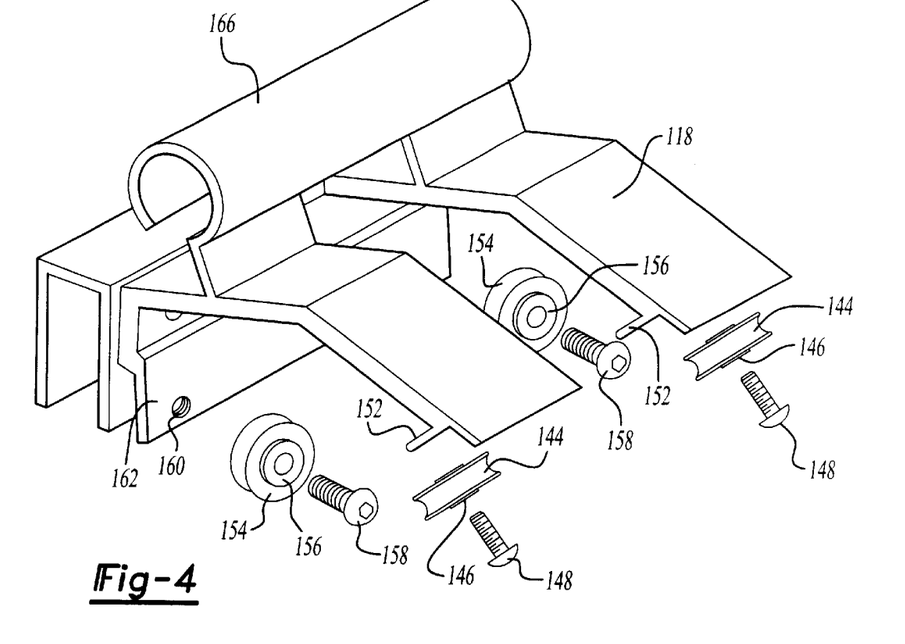
FIG. 4 is a partial rear exploded perspective view of the embodiment of the trim stock scoring tool of FIG. 3.

Referring to FIGS. 3 and 4, upper concave rollers 144 include bearings 146 and are rotatably secured to the carriage 118 by means of screws 148 that are received in threaded holes 150 formed in an upper flange 152 of the carriage 118. Likewise, lower concave rollers 154 include bearings 156 for rotatably securing the rollers 154 to the carriage 118. The rollers 154 are secured by screws 158 to a threaded hole 160 formed in a lower flange 162 on the carriage 118.

As shown in FIG. 3, a handle 166 is provided on the carriage 118 for gripping the scoring tool 110 and manually moving it along the track 122 and rail 126 with the concave upper rollers 144 engaging the upper track 122 and the lower rollers 154 riding on the rail 126.

Referring now to FIGS. 3 and 5–10, the structure of the holder 114 and retainer housing 116 are described in greater detail. A blade recess 168 is formed on one end of the holder 114 for receiving the knife blade 112. A blade notch 170 is formed in the knife blade 112. A rib 172 is received in the blade notch 170 and holds the knife blade 112 on the holder 114 in conjunction with screw 174 or by screws 175. The holder 114 and retainer housing 116 have a pivot hole 176 formed therein for a pivot pin bolt 178 to be inserted and secured to a threaded hole 180.

Figure 5:
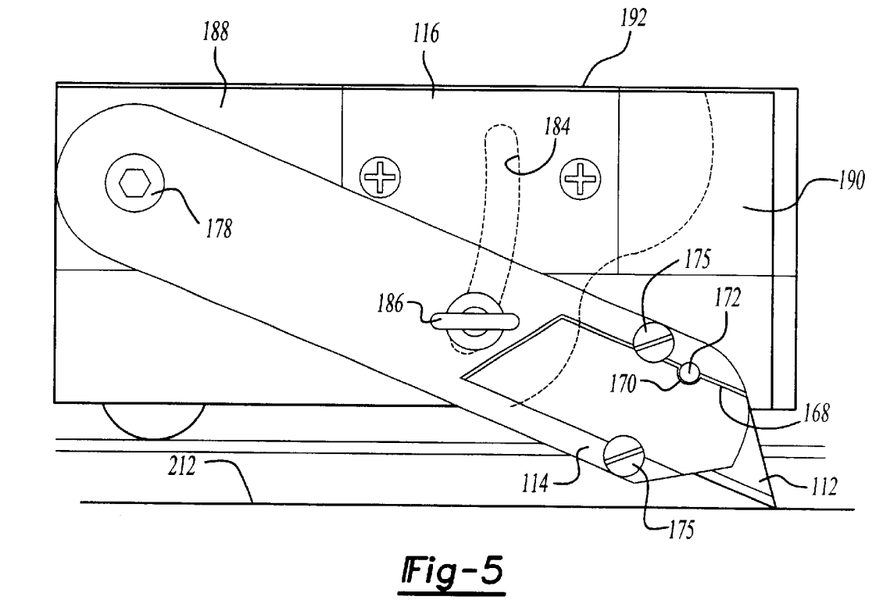
FIG. 5 is a diagrammatic front elevation view showing the holder for the knife blade partially disposed in the retainer housing.
Figure 6:
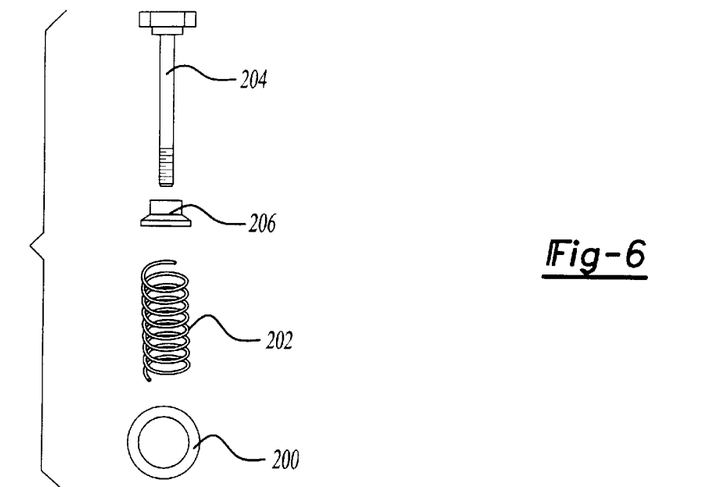
FIG. 6 is an exploded elevation view of the carriage bolt and spring adjustment mechanisms.
Figure 7:
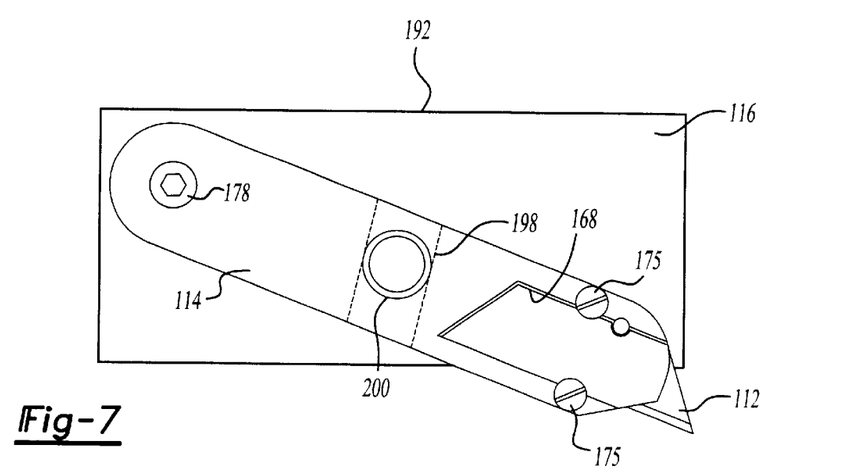
FIG. 7 is a diagrammatic front elevation view showing the knife blade holder with the retainer housing partially removed.
Figure 8:
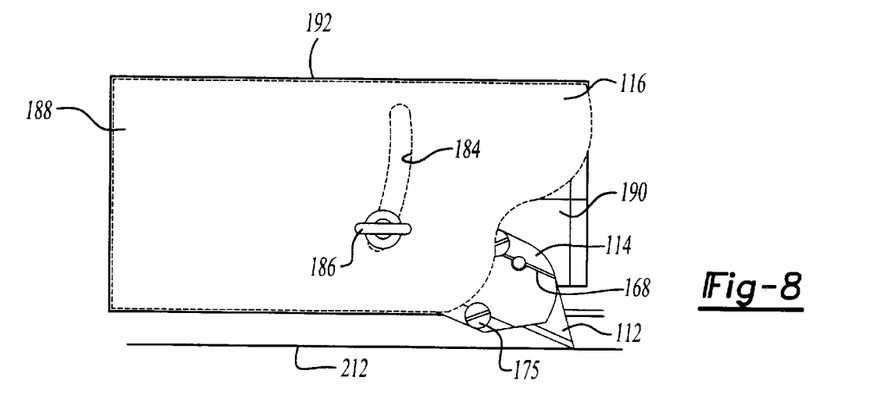
FIG. 8 is a front elevation view of the retainer housing and knife blade holder.
Figure 9:
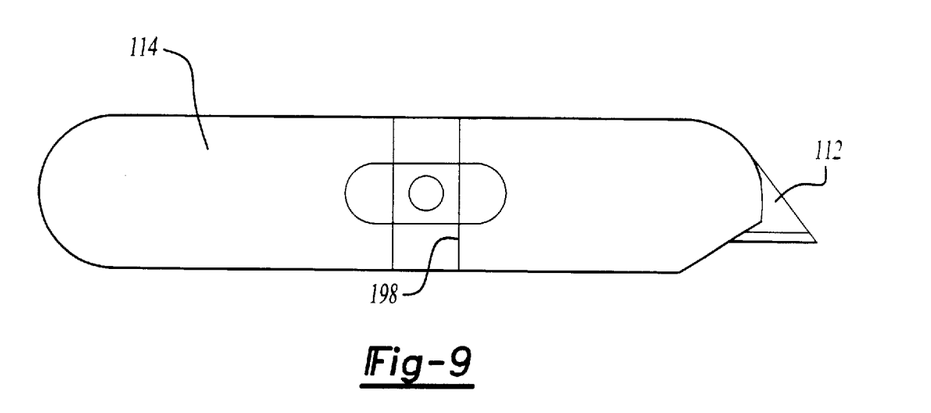
FIG. 9 is a front elevation view of the knife blade holder.

Referring to FIGS. 3, 5, and 8, an arcuate slot 184 is provided on the retainer housing 116 through which a lock screw 186 may pass. The lock screw 186 is secured to the holder 114. The retainer housing 116 includes a front wall 188, rear wall 190 and a top wall 192. The arcuate slot 184 is formed in the front wall 188 of the retainer housing 116. The rear wall 190 is secured to the carriage 118.

Referring now to FIGS. 3, 6, 7, 9, and 10, an elongated opening 196 is formed in the top wall 192. A transverse slot 198 is formed through the holder 114. A tube 200 is secured within the holder 114 by the lock screw 186 with its axis transverse to the length of the transverse slot 198. Lock screw 186 may be a knob as shown in FIG. 3 or a wing nut as shown in FIGS. 5 and 8. A spring 202 is retained on a carriage bolt 204 that extends through the top wall 192 of the retainer housing 116. A cap 206 is provided on the carriage bolt 204 to locate the spring 202 within the retainer housing 116.

Figure 10:
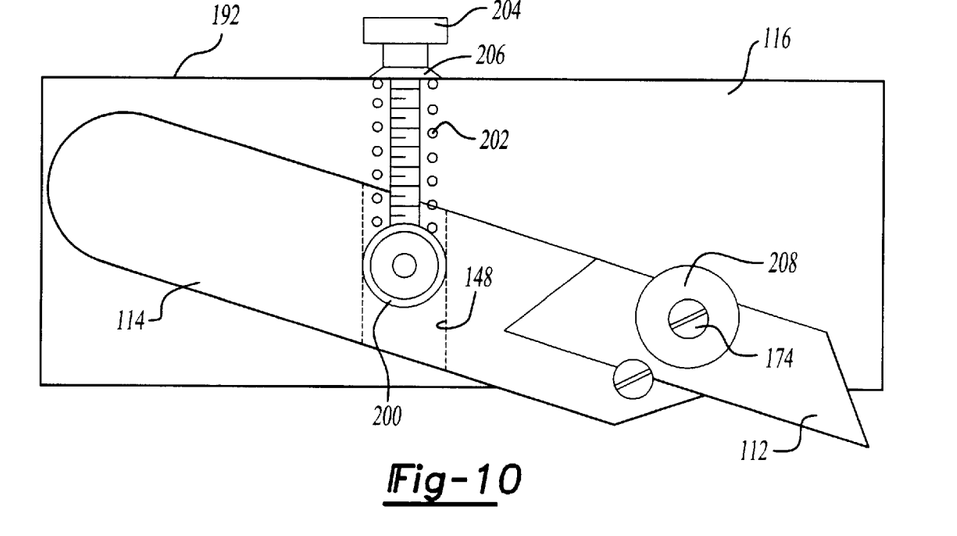
FIG. 10 is a diagrammatic side elevation view showing the top adjustment bolt and screw engaging the knife blade holder.

Referring now to FIG. 10, a washer 208 is shown through which fastener 174 is received to aid in retaining the knife blade 112 on the holder 114.

In the embodiments of FIGS. 3–10, two adjustment mechanisms are shown in the form of lock screw 186 and carriage bolt 204. Both of these adjustment mechanisms may be provided with knobs to facilitate tightening and loosening the adjustment mechanisms. While two different adjustment mechanisms are shown for this embodiment, either adjustment mechanism could be used by itself to adjust the location of the knife blade 112 relative to the coil stock 212 to be cut. The retainer housing 116 preferably includes an adjustable mounting mechanism for mounting the holder 114 within the retainer housing 116 so that the knife blade 112 is at the proper height for scoring. The adjustment mechanism may include a spring 202 that exerts a biasing force downwardly on the holder 114 causing the knife blade 112 to be resiliently secured within the retainer housing 116. This resiliency provides some degree of tolerance in adjusting the height of the knife blade 112 so that adequate scoring is provided without overscoring that can lead to excessive knife wear. The force applied to the knife blade 112 may be moderated by the strength of the spring used.

Figure 11:
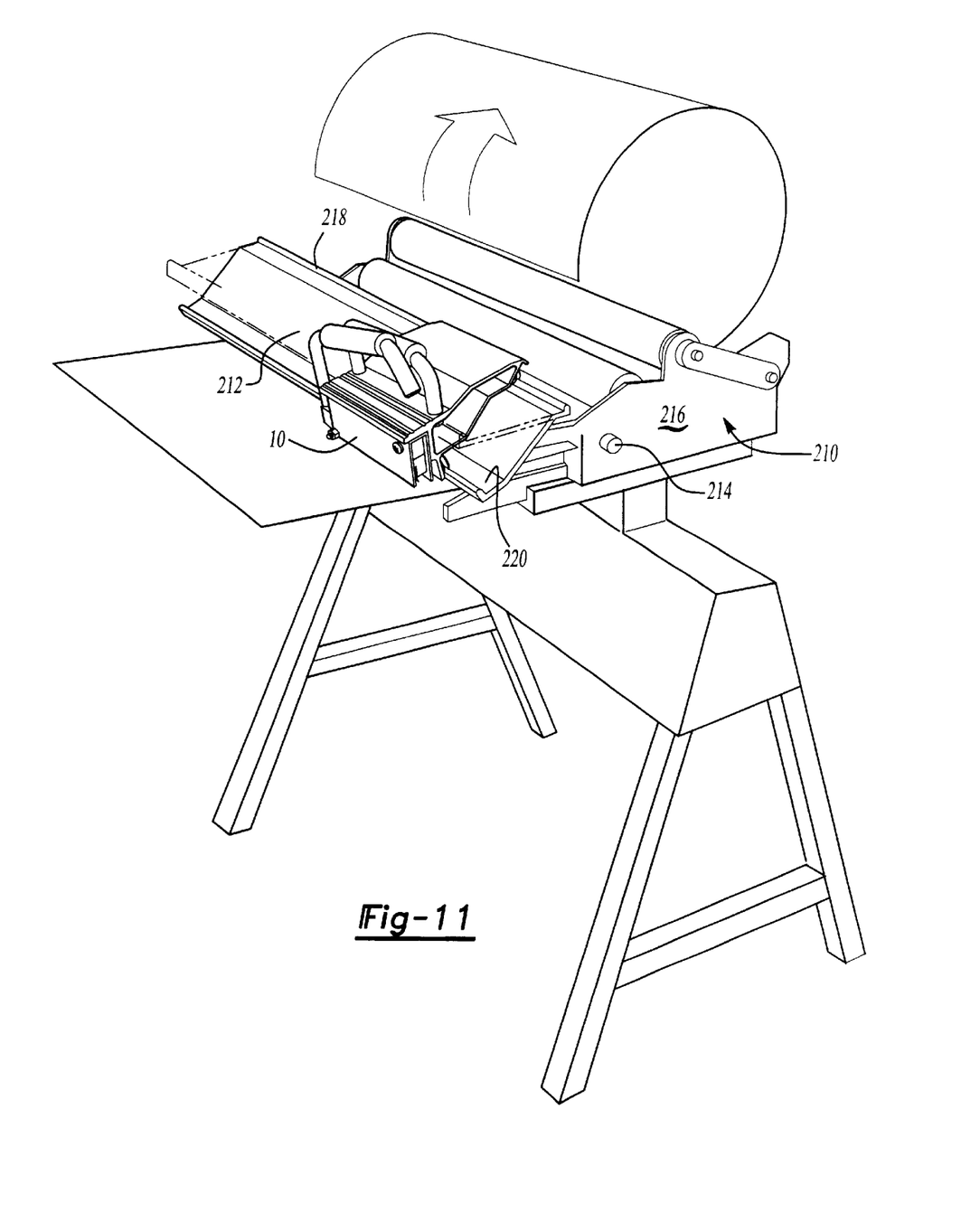
FIG. 11 is a perspective view of a trim stock scoring tool of the present invention shown on a coil holder.

Referring to FIG. 11, the trim stock scoring tool 10 is shown on a coil holder 210. The coil holder 210 has a plate 212 that is pivotally attached to the upper portion of the coil holder 210 by fasteners 214 on the sides 216 of the coil holder 210. The phantom lines show the plate in its upper pivoted position. The plate 212 has an upper track 218 and a lower track 220 on which the trim stock scoring tool 10 is adapted to travel.

Figure 12:
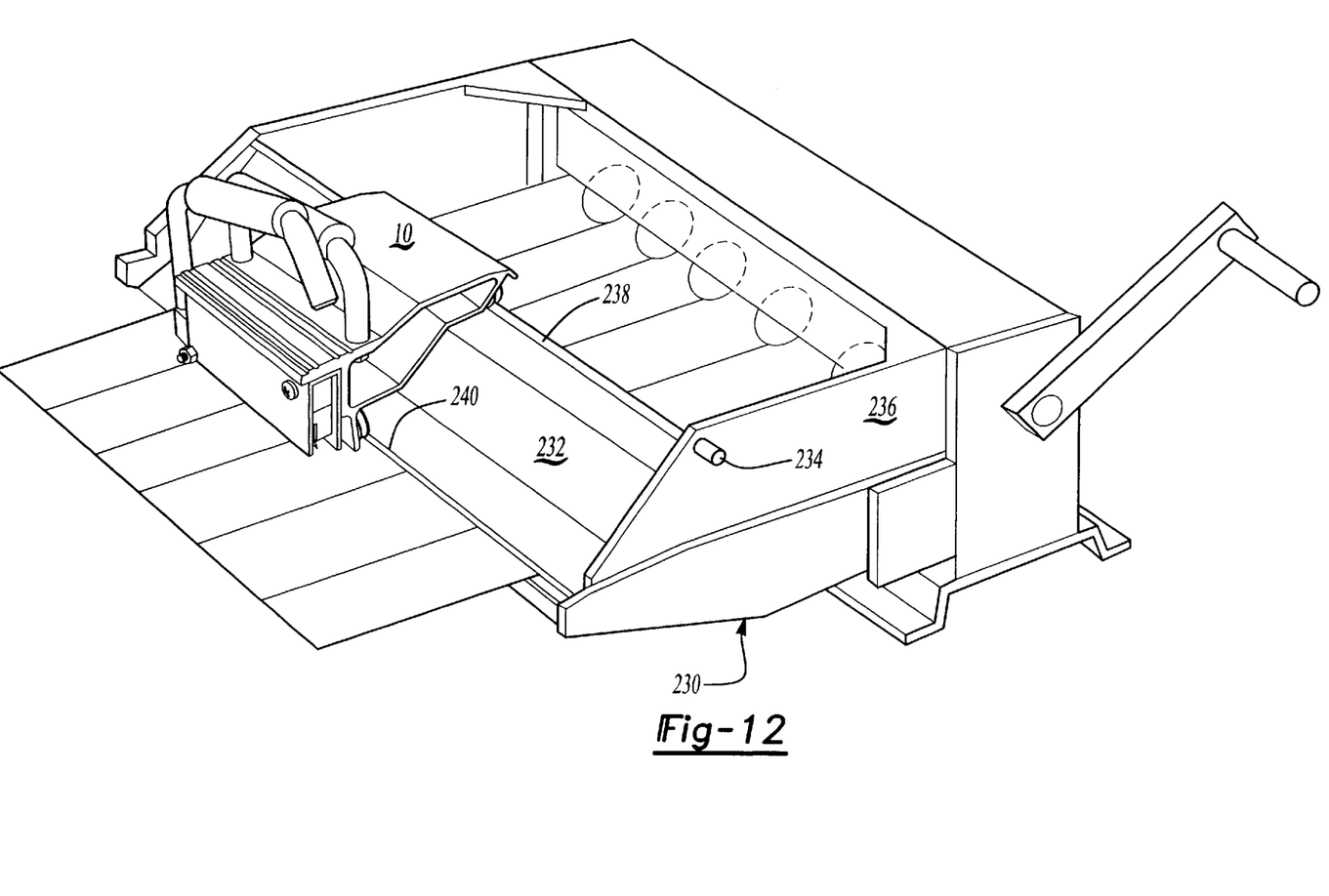
FIG. 12 is a perspective view of a trim stock scoring tool of the present invention shown on a slitter.

Referring to FIG. 12, the trim stock scoring tool 10 is shown on a slitter 230. The slitter 230 has a plate 232 that is pivotally attached to the upper portion of the slitter 230 by fasteners 234 on the sides 236 of the slitter 230. The plate 232 has an upper track 238 and a lower track 240 on which the trim stock scoring tool 10 is adapted to travel.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sheet stock cut-off tool and a bending brake in combination, comprising:
   the bending brake comprising:
      a track;
      clamping members for clamping a piece of sheet stock in the bending brake; and
      a bending bar for selectively bending the piece of sheet stock;

the cut-off tool comprising:
- a carriage having a set of rollers for guiding the carriage as it is moved along the track on the brake;
- a knife blade holding assembly secured to the carriage;
- a knife blade carried by the knife blade holding assembly;
- a handle attached to the carriage for moving the carriage on the track relative to the bending brake;
- a force application member operatively connected to the knife blade holding assembly that selectively causes the knife blade to be extended relative to the carriage to score the piece of sheet stock along a line dividing the sheet stock into a first portion clamped by the clamping member of the bending brake and a second portion that is not clamped by the clamping members without cutting through the sheet stock while it is clamped in the bending brake; and
- wherein the second portion of the sheet stock is cut-off by bending the second portion relative to the first portion while the first portion is clamped by the clamping members until the sheet separates at the score line.

2. The scoring tool of claim 1 wherein the knife blade holding assembly is pivotally secured to the carriage.

3. The scoring tool of claim 1 further comprising a spring biasing the knife blade holding assembly against being extended relative to the carriage.

4. The scoring tool of claim 3 wherein the force application member comprises a handle connected to the knife blade holding assembly that pivots the knife blade holding assembly against the force of the spring to cause the knife to be extended relative to the carriage to force the blade into engagement with the sheet stock as the carriage is moved along the track.

5. The scoring tool of claim 1 further comprising a retainer housing fixedly secured to the carriage, the knife blade holding assembly being pivotally secured to the retainer housing.

6. The scoring tool of claim 1 wherein the handle is attached by fasteners to the carriage.

7. The scoring tool of claim 1 wherein the knife blade is a common utility knife blade.

8. The scoring tool of claim 1 wherein the track on the bending brake comprises two parallel ribs extending in the a direction that the carriage is moved on the bending brake, and wherein two pairs of rollers are secured to the carriage, each pair of rollers being positioned to engage one of the ribs forming the track.

9. The scoring tool of claim 8 wherein the ribs have a convex surface and the pairs of rollers have concave perimeters that are adapted to ride upon the convex surface of the ribs.

10. The scoring tool of claim 1 wherein the knife blade is retained on the carriage at a known distance from a front edge of the clamping members that corresponds to a preferred length of cut of the sheet stock.

* * * * *